United States Patent [19]

Ross

[11] 4,437,207

[45] Mar. 20, 1984

[54] MAGNETIC, FORCE-LIMITED APPARATUS FOR TENDERIZING MEAT

[76] Inventor: Henry M. Ross, The Lawn, Nokesville, Va. 22123

[21] Appl. No.: 391,835

[22] Filed: Jun. 24, 1982

[51] Int. Cl.³ .............................................. A22C 9/00
[52] U.S. Cl. ......................................... 17/25; 83/543
[58] Field of Search .................. 17/25, 26, 27; 83/543

[56] References Cited

U.S. PATENT DOCUMENTS

| 3,535,734 | 10/1970 | Ross | 17/25 |
| 3,736,583 | 5/1973 | Smith et al. | 17/25 X |
| 4,055,872 | 11/1977 | Wagner | 17/25 |
| 4,086,683 | 5/1978 | Davis et al. | 17/25 |
| 4,216,566 | 8/1980 | Bettcher | 17/25 |
| 4,338,701 | 7/1982 | d'Arras | 17/25 |

Primary Examiner—Willie G. Abercrombie
Attorney, Agent, or Firm—Crickenberger & Moore

[57] ABSTRACT

An apparatus for tenderizing meat has a movable head member with closely-spaced, independently force-limited cutting elements positioned over a conveyor belt for severing the meat fibers with orthogonally oriented cuts as the meat is successively positioned by longitudinal and lateral movements of the conveyor belt. The cutting elements are secured in position by magnets exerting a predetermined force. When the resistance encountered in the meat exceeds this force, the cutting elements will be pushed back into the movable head member, thereby protecting them from damage.

11 Claims, 4 Drawing Figures

MAGNETIC, FORCE-LIMITED APPARATUS FOR TENDERIZING MEAT

BACKGROUND OF THE INVENTION

This invention is an improvement upon the apparatus disclosed and claimed in U.S. Pat. No. 3,535,734, issued to Henry M. Ross on Oct. 27, 1970, for FLUID-OPERATED, FORCE-LIMITED APPARATUS FOR TENDERIZING MEAT.

Before the introduction of the apparatus patented by the applicant in U.S. Pat. No. 3,535,734, the mechanical treatment of meat with tough fibers was accomplished by crushing and tearing the fibers manually with hammers or cutting the fibers with rigidly-mounted knives or spring-biased spikes. This treatment was suitable only for thin, boneless cuts. The patented apparatus developed by the applicant made it possible to utilize a true force-limited insertion into the meat of cutting elements, thereby allowing bone-in treatment of large, intermediate cuts of meat prior to the final butchering cuts. While applicant's patented apparatus has met with great commercial success, the fluid pressure system required for operation caused the device to be somewhat complex and expensive in construction and repair.

SUMMARY OF THE INVENTION

The present invention has for its principal object the provision of a magnetic force-limited apparatus to replace the fluid-operated, force-limited apparatus presently utilized in the apparatus disclosed in U.S. Pat. No. 3,535,734.

The features of the invention are realized by the use of rare earth magnets of the cobalt-samarium variety. These magnets are characterized by high field strength and retentivity. The magnets are incorporated in a movable head member which has a vertically-reciprocable set of closely-spaced, independently-movable, cutting elements disposed over a conveyor belt which is programmed for longitudinal and lateral movements as the cutting elements reciprocate vertically. The cutting elements have special pole pieces of electrical steel with a high magnetic saturation level attached to the ends opposite the cutting edges. The magnets in the movable head member attract the pole pieces thereby holding the cutting elements in a fully extended downward position until a force is encountered which exceeds the holding power of the magnet, at which time the cutting element retracts before it is damaged by excessive force. The magnet size and pole piece design are selected to provide the desired holding power to be used with a given size of cutting element to prevent damage.

DESCRIPTION OF THE PREFERRED EMBODIMENTS

Figure 1:
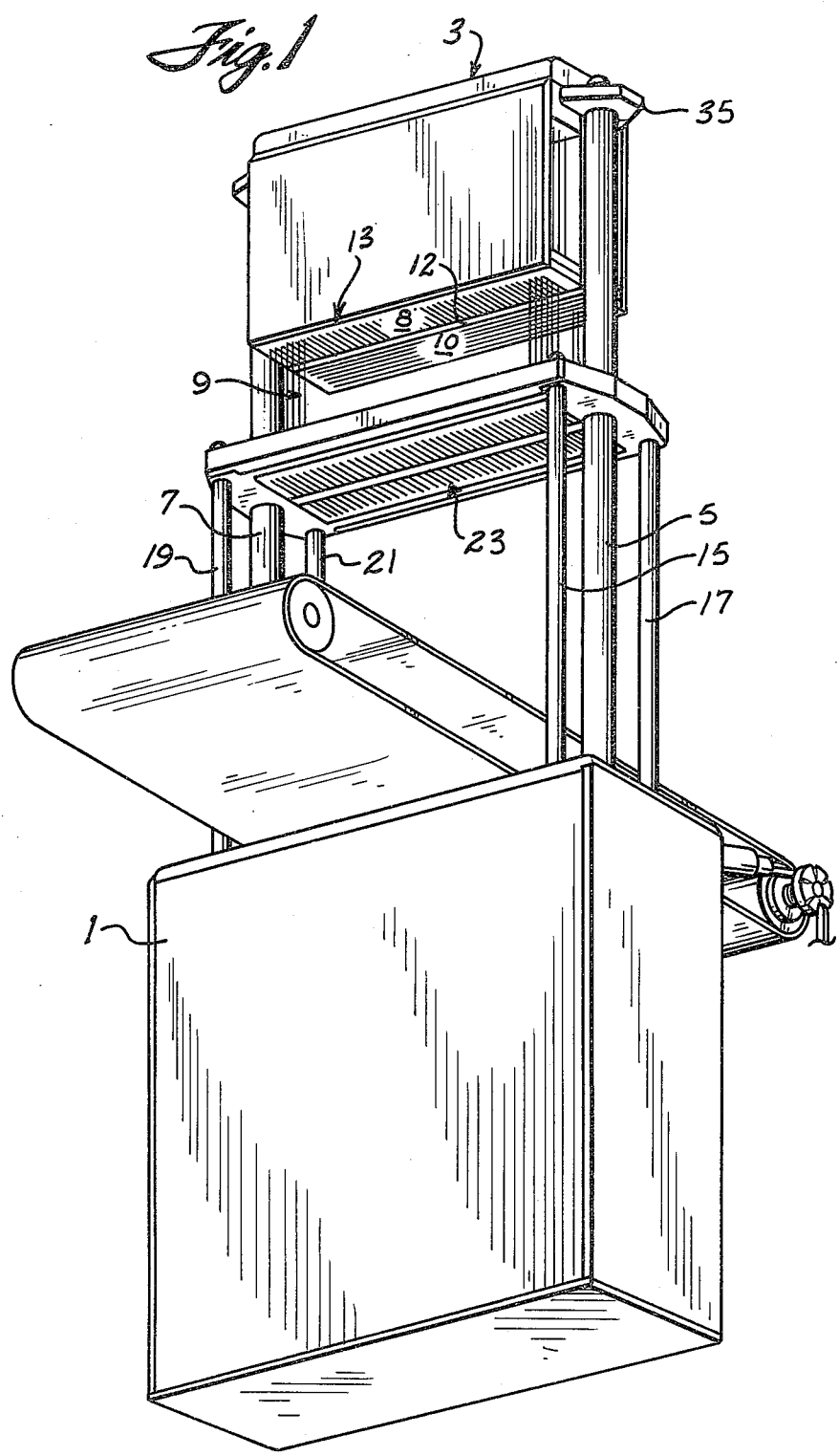
FIG. 1 is a perspective view in simplified form of an apparatus embodying the features of the present invention.

The invention will be understood more readily by referring to the following description which conforms to the invention as illustrated in the drawings. The perspective view of FIG. 1 shows an apparatus which is generally similar in appearance and function to the meat tenderizer apparatus disclosed in U.S. Pat. No. 3,535,734. The principal difference between the two is the absence of the fluid pressure system in the present apparatus. The fluid pressure, force-limiting system of the prior art has been replaced with a magnetic force-limiting system in which the cutting elements are held in position by magnetic attraction until a predetermined resistance is encountered by the cutting elements in piercing the meat to be tenderized. When the predetermined resistance exceeds the force of the magnetic attraction, the cutting elements retract and are not damaged by being subjected to excessive force.

The cabinet 1 has mounted thereon a movable head member 3 which is supported by a pair of head rod supports 5 and 7. A plurality of cutting elements shown generally at 9 depend from the lower surface of movable head member 3, and project through upper guide 13. Typically, there are 528 cutting elements arranged in 12 rows of 44 elements each. The cutting elements 9 are arranged in two groups, designated generally as 8 and 10. The cutting elements within each group have their cutting edges in parallel relationship. The cutting edges of the elements in group 8 are disposed orthogonally with respect to the cutting edges of the elements of group 10. The groups 8 and 10 are separated by a divider plate 12.

Beneath the cutting elements 9 and depending from movable head member 3 is a lower guide and hold-down member 23 which is mounted on and held in position by hold-down rod supports 15, 17, 19 and 21. Both upper guide 13 and lower guide and hold-down member 23 are provided with spaced apertures which coincide with the positioning of cutting elements 9 to provide free passage therethrough.

Figure 2:
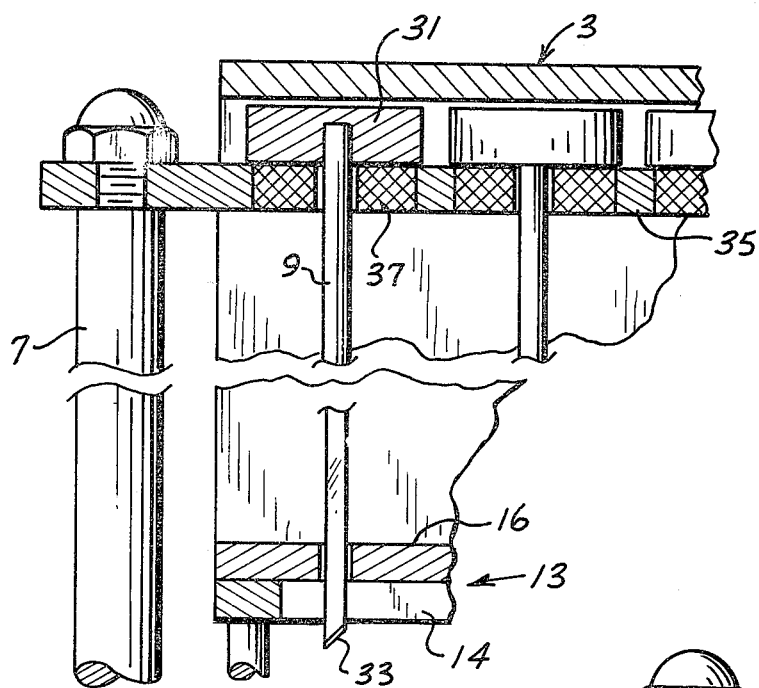
FIG. 2 is a partial cross-sectional view of a first embodiment of the invention showing the movable head member at the top of its stroke.

A partial detail showing of the movable head member 3 can be seen from FIG. 2. A cutting element 9 has a pole piece 31 attached to the end opposite the cutting edge 33. The cutting element 9 is positioned for vertically reciprocating movement through upper guide member 13. Guide member 13 is made up of comb members 14 and 16 having transverse and longitudinal tines, respectively, which form a supporting guide structure for the cutting element 9. A supporting plate member 35 is attached to head rod supports 5 and 7 for movement therewith. A magnet, such as magnet 37, is inset in supporting plate member 35 to attract the pole piece 31 of the associated cutting element 9, thereby holding it in a rigid downwardly depending position.

It may be desirable to utilize a magnetic flux density which exceeds the flux density obtainable in the material of the magnet being employed. In this case the structure shown in FIG. 2 would be slightly modified to insert additional pole piece material between the magnet 37 and the pole piece 31 to concentrate the flux density adjacent the magnet 37 and to increase the magnetic attraction exerted on pole piece 31. Such modified structure (not shown) could be effected in several different variations in accordance with principles which are well known in the art. No specific modification is shown since the elementary use of the magnet 37 and at traced pole piece 331 clearly illustrates the invention.

Figure 3:
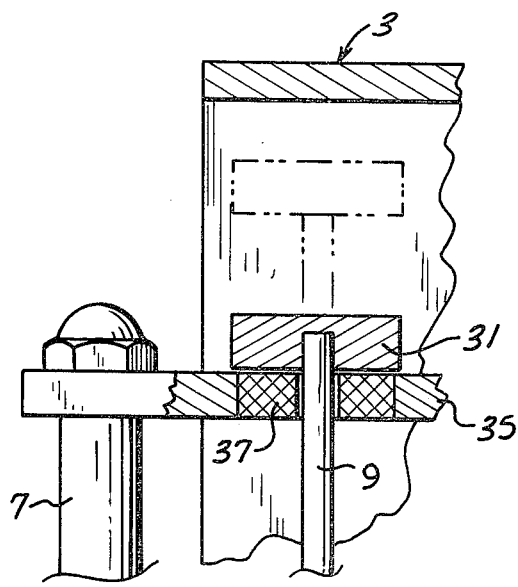
FIG. 3 is a partial cross-sectional view of the mechanism of FIG. 1 in which the movable head member is on its downward stroke, and in which the cutting element is shown in dotted lines as having met the predetermined resistance required to cause the cutting element to retract.

FIG. 3 is a partial detail similar to FIG. 2, but in which the supporting plate member 35 has moved downwardly to a point where the cutting element 9 has encountered resistance in excess of the predetermined force required to overcome the magnetic attraction. Cutting element 9 with pole piece 31 is shown in phantom view as having been pushed back into movable head member 3, thereby protecting cutting element 9 from bending or breaking.

The magnetic materials utilized in accordance with the present invention are selected from the rare earth varieties. A cobalt-samarium alloy has been found to possess the required high field strength and retentivity necessary to attain the attractive forces consonant with the size limitations in the structure shown. Special pole piece material of silicon iron is used in conjunction with the cobalt-samarium magnets.

The cutting elements 9 are expendable parts and must be replaced from time to time. For this reason it has been more economical to manufacture the cutting elements with pole pieces attached rather than with magnets attached, because the magnets are more expensive than the pole pieces. It will be appreciated, however, that from the standpoint of the invention, it would be just as feasible to place the magnet on the cutting element, and to incorporate the pole piece into the supporting plate member.

Figure 4:
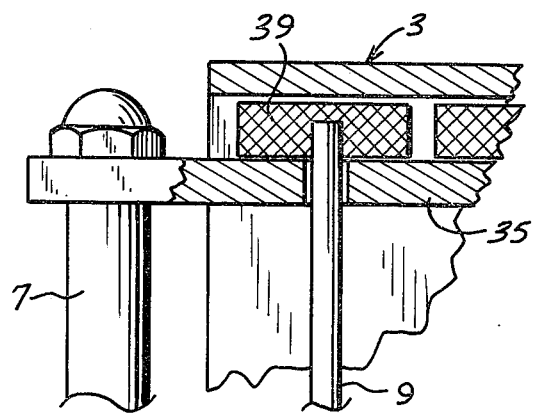
FIG. 4 is a partial cross-sectional view of a second embodiment of the invention showing the movable head member at the stop of its stroke.

FIG. 4 is a partial detail in which is shown a magnet 39 attached to cutting element 9. The supporting plate member 35 is constructed of silicon iron and functions as a pole piece for the magnets associated with the individual cutting elements. The operation of this embodiment of the invention is exactly the same as that shown in FIGS. 2 and 3.

What is claimed is:

1. An apparatus for tenderizing meat comprising
   support means for supporting meat to be tenderized,
   a plurality of cutting elements comprising relatively thin blades with cutting edges for piercing and cutting meat,
   means for mounting each of the cutting elements for independent, force-limited insertion into the meat, said means for mounting comprising magnetic means associated with each of the cutting elements to provide a predetermined force for holding each cutting element in fixed position as the element is inserted in the meat to be tenderized.
2. The combination according to claim 1 wherein
   said cutting elements are slidably mounted in a movable head member for insertion into the meat to be tenderized,
   said magnetic means forming a part of said movable head member.
3. The combination according to claim 2 wherein
   each of the cutting elements has a pole piece element attached to a portion thereof to be attracted by said magnetic means.
4. The combination according to claim 3 wherein
   the support means comprises conveyor means for moving the meat past the cutting elements.
5. The combination according to claim 4 wherein
   the cutting elements have cutting edges disposed in orthogonal relationship.
6. The combination according to claim 1 wherein the means for mounting the cutting elements comprises
   a movable head member adapted to be moved toward and away from the support means,
   said cutting elements depending from and being slidably mounted in said movable head member so that each element can be pushed back into the movable head member upon encountering a predetermined resisting force in the meat as the movable head member moves toward the support means on which the meat is supported.
7. The combination according to claim 6 comprising
   hold-down means for holding the meat in position on said support means when the cutting elements are being removed.
8. The combination according to claim 7 comprising
   means for advancing said support means a predetermined longitudinal distance, and
   means for moving said support means a predetermined lateral distance.
9. The combination according to claim 8 wherein
   said magnetic means comprise rare earth magnets of cobalt-samarium.
10. The combination according to claim 9 wherein
    said magnetic means are incorporated in said movable head member, and
    each of said cutting elements has a pole piece element attached to a portion thereof to be attracted by said magnetic means.
11. The combination according to claim 9 wherein
    said magnetic means are attached to a portion of each of said cutting elements, and
    said movable head member comprises pole pieces, whereby said magnetic means are attracted to said pole pieces to hold the cutting elements in position fully extended below said movable head member.

* * * * *